(12) United States Patent
Yamaguchi et al.

(10) Patent No.: US 11,070,577 B2
(45) Date of Patent: Jul. 20, 2021

(54) DATA DETERMINATION DEVICE, DATA DETERMINATION METHOD, AND DATA DETERMINATION PROGRAM

(71) Applicant: MITSUBISHI ELECTRIC CORPORATION, Tokyo (JP)

(72) Inventors: Teruyoshi Yamaguchi, Tokyo (JP); Tsunato Nakai, Tokyo (JP); Koichi Shimizu, Tokyo (JP); Nobuhiro Kobayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 219 days.

(21) Appl. No.: 16/468,544

(22) PCT Filed: Jan. 20, 2017

(86) PCT No.: PCT/JP2017/002013
§ 371 (c)(1),
(2) Date: Jun. 11, 2019

(87) PCT Pub. No.: WO2018/134981
PCT Pub. Date: Jul. 26, 2018

(65) Prior Publication Data
US 2020/0092313 A1 Mar. 19, 2020

(51) Int. Cl.
*H04L 29/06* (2006.01)
(52) U.S. Cl.
CPC ...... *H04L 63/1425* (2013.01); *H04L 63/0263* (2013.01); *H04L 63/101* (2013.01)
(58) Field of Classification Search
None
See application file for complete search history.

(56) References Cited

U.S. PATENT DOCUMENTS

2017/0279622 A1 * 9/2017 Yamaguchi ......... H04L 63/0227

FOREIGN PATENT DOCUMENTS

| JP | 2001-34553 A | 2/2001 |
| JP | 4688420 B2 | 5/2011 |

(Continued)

OTHER PUBLICATIONS

Danelutto et al., "Deep Packet Inspeciton on Commodity Hardware using FastFlow," Advances in Parallel Computing, vol. 25, 2014, pp. 92-99.

(Continued)

*Primary Examiner* — Joseph P Hirl
*Assistant Examiner* — Hassan Saadoun
(74) *Attorney, Agent, or Firm* — Birch, Stewart, Kolasch & Birch, LLP.

(57) ABSTRACT

An allowed communication list conversion unit (123) assigns one or more flags to request communication and response communication, between which a correspondence relationship is described in a detection rule, and describes, in an allowed communication list, details of a flag operation specifying a value to be set to the flag and a flag condition for determining whether the value to be set is set in the flag, in association with each other. A determination unit (103) sets the value after determining that communication data on the request communication is normal, determines whether the value is set in the flag based on the flag condition when determining whether communication data on the response communication to the request communication is normal, and determines that the communication data on the response communication is normal when the value is set, to thereby reset the flag.

8 Claims, 13 Drawing Sheets

(56) References Cited

FOREIGN PATENT DOCUMENTS

| JP | 6054010 B2 | * | 12/2016 | ......... H04L 63/0227 |
|----|----|----|----|----|
| WO | WO 03/077071 A2 | | 9/2003 | |
| WO | WO 2016/114077 A1 | | 7/2016 | |
| WO | WO-2016114077 A1 | * | 7/2016 | ......... H04L 63/1416 |

OTHER PUBLICATIONS

Dharmapurikar et al., "Deep Packet Inspection using Prallel Bloom Filters," In proc. 11th Symp. High Performance Interconnects(HOTI'03), 2003, pp. 44-51.

Goldenberg et al., "Accurate modeling of Modbus/TCP for intrusion detection in SCADA systems," Internationl Journal of Critical Infrastructure Protection, vol. 6, issue 2, 2013, pp. 63-75.

Lin et al., "Accelerating String Matching Using Multi-threaded Algorithm on GPU," Global Telecommunications Conference (GLOBECOM 2010), IEEE, 2010, pp. 1-5.

Nakai et al., "Design of Whitelisting Intrusion Detection Method for Plant Control System," Symposium on Cryptography and Information Security, Jan. 19, 2016, pp. 1-8.

Shimizu et al., "Automated Generation of a Whitelist for intrusion Detection," Symposium on Cryptography and Information Security, Jan. 19, 2016, pp. 1-7.

* cited by examiner

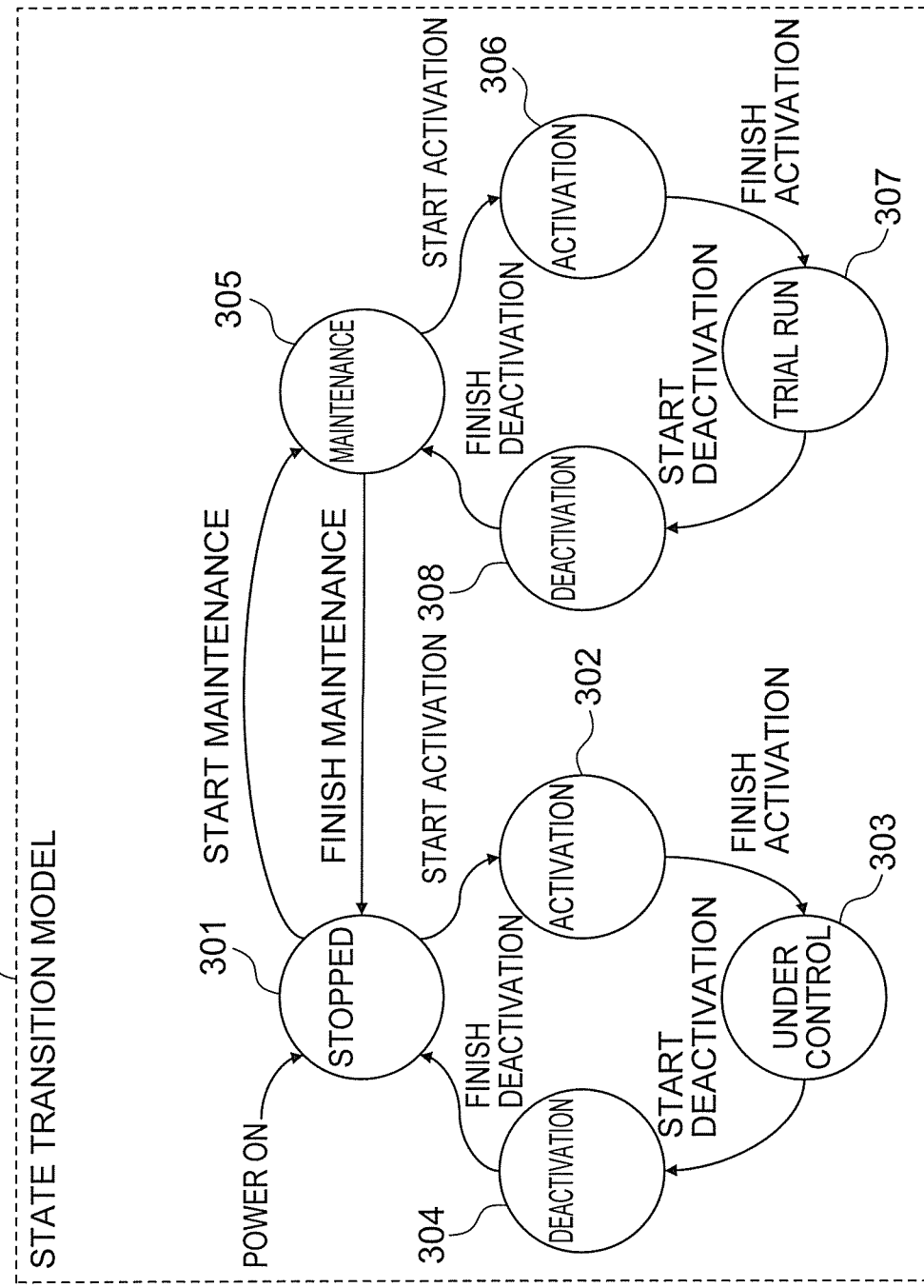

| OPERATION STATE | RULE NUMBER | TRANSMISSION SOURCE INFORMATION | TRANSMISSION DESTINATION INFORMATION | RECEPTION DATA CONDITION ||||||
|---|---|---|---|---|---|---|---|---|
| | | | | REQUEST RULE NUMBER | RESPONSE RULE NUMBER | COMMAND TYPE | DATA SIZE | DATA SET RANGE | PERIOD [SECONDS] |
| STOPPED 301 | 1 | 192.168.0.10 | 192.168.0.50 | | 2 | ACQUIRE DEVICE STATE | 100 | — | 1±0.1 |
| | 2 | 192.168.0.50 | 192.168.0.10 | 1 | | ACQUIRE DEVICE STATE | 100 | — | — |
| | 3 | 192.168.0.10 | 192.168.0.50 | | ... | ... | ... | ... | ... |
| | 4 | 192.168.0.50 | 192.168.0.10 | 4 | | ... | ... | ... | ... |
| ACTIVATION 302 | 5 | 192.168.0.10 | 192.168.0.50 | | 6 | START DEVICE | 10 | — | — |
| | 6 | 192.168.0.50 | 192.168.0.10 | 5 | | START DEVICE | 10 | — | — |
| | 7 | 192.168.0.10 | 192.168.0.50 | | 8 | ... | ... | ... | ... |
| | 8 | 192.168.0.50 | 192.168.0.10 | 7 | | ... | ... | ... | ... |
| UNDER CONTROL 303 | 9 | 192.168.0.10 | 192.168.0.50 | | 10 | ACQUIRE DEVICE STATE | 100 | — | 1±0.1 |
| | 10 | 192.168.0.50 | 192.168.0.10 | 9 | | ACQUIRE DEVICE STATE | 100 | — | — |
| | 11 | 192.168.0.10 | 192.168.0.50 | | 12 | CHANGE SET VALUE | 10 | 0~100 | TWO OR MORE |
| | 12 | 192.168.0.50 | 192.168.0.10 | 11 | | CHANGE SET VALUE | 10 | — | — |
| | 13 | 192.168.0.10 | 192.168.0.50 | | 14 | ... | ... | ... | ... |
| | 14 | 192.168.0.50 | 192.168.0.10 | 13 | | ... | ... | ... | ... |
| DEACTIVATION 304 | 15 | 192.168.0.10 | 192.168.0.50 | | 16 | STOP DEVICE | 10 | — | — |
| | 16 | 192.168.0.50 | 192.168.0.10 | 15 | | STOP DEVICE | 10 | — | — |
| | 17 | 192.168.0.10 | 192.168.0.50 | | 18 | ... | ... | ... | ... |
| | 18 | 192.168.0.50 | 192.168.0.10 | 17 | | ... | ... | ... | ... |
| MAINTENANCE 305 | 19 | 192.168.0.10 | 192.168.0.50 | | 20 | ACQUIRE DEVICE STATE | 100 | — | 1±0.1 |
| | 20 | 192.168.0.50 | 192.168.0.10 | 19 | | ACQUIRE DEVICE STATE | 100 | — | — |
| | 21 | 192.168.0.10 | 192.168.0.50 | | 22 | UPDATE PROGRAM | 1000 | — | — |
| | 22 | 192.168.0.50 | 192.168.0.10 | 21 | | UPDATE PROGRAM | 10 | — | — |
| | 23 | 192.168.0.10 | 192.168.0.51 | | | ... | ... | ... | ... |
| | 24 | 192.168.0.51 | 192.168.0.10 | 24 | | ... | ... | ... | ... |

| RULE NUMBER | TRANSMISSION SOURCE INFORMATION | TRANSMISSION DESTINATION INFORMATION | COMMAND TYPE | DATA SIZE | DATA SET RANGE | TIMER CONDITION | FLAG CONDITION | ACTION NUMBER |
|---|---|---|---|---|---|---|---|---|
| 1 | 192.168.0.10 | 192.168.0.50 | ACQUIRE DEVICE STATE | 100 | — | T1 > 0.9<br>T1 < 1.1 | — | 1 |
| 2 | 192.168.0.50 | 192.168.0.10 | ACQUIRE DEVICE STATE | 100 | — | — | F1==1 | 2 |
| 3 | 192.168.0.10 | 192.168.0.50 | ... | ... | ... | ... | — | 3 |
| 4 | 192.168.0.50 | 192.168.0.10 | ... | ... | ... | ... | F2==1 | 4 |
| 5 | 192.168.0.10 | 192.168.0.50 | START DEVICE | 10 | — | — | — | 5 |
| 6 | 192.168.0.50 | 192.168.0.10 | START DEVICE | 10 | — | — | F3==1 | 6 |
| 7 | 192.168.0.10 | 192.168.0.50 | ... | ... | ... | ... | — | 7 |
| 8 | 192.168.0.50 | 192.168.0.10 | ... | ... | ... | ... | F4==1 | 8 |
| 9 | 192.168.0.10 | 192.168.0.50 | ACQUIRE DEVICE STATE | 100 | — | T2 > 0.9<br>T2 < 1.1 | — | 9 |
| 10 | 192.168.0.50 | 192.168.0.10 | ACQUIRE DEVICE STATE | 100 | — | — | F5==1 | 10 |
| 11 | 192.168.0.10 | 192.168.0.50 | CHANGE SET VALUE | 10 | 0~100 | T3 >2 | — | 11 |
| 12 | 192.168.0.50 | 192.168.0.10 | CHANGE SET VALUE | 10 | — | — | F6==1 | 12 |
| 13 | 192.168.0.10 | 192.168.0.50 | ... | ... | ... | ... | — | 13 |
| 14 | 192.168.0.50 | 192.168.0.10 | ... | ... | ... | ... | F7==1 | 14 |
| 15 | 192.168.0.10 | 192.168.0.50 | STOP DEVICE | 10 | — | — | — | 15 |
| 16 | 192.168.0.50 | 192.168.0.10 | STOP DEVICE | 10 | — | — | F8==1 | 16 |
| 17 | 192.168.0.10 | 192.168.0.50 | ... | ... | ... | ... | — | 17 |
| 18 | 192.168.0.50 | 192.168.0.10 | ... | ... | ... | ... | F9==1 | 18 |
| 19 | 192.168.0.10 | 192.168.0.50 | ACQUIRE DEVICE STATE | 100 | — | T4 > 0.9<br>T4 < 1.1 | — | 19 |
| 20 | 192.168.0.50 | 192.168.0.10 | ACQUIRE DEVICE STATE | 100 | — | — | F10==1 | 20 |
| 21 | 192.168.0.10 | 192.168.0.50 | UPDATE PROGRAM | 1000 | — | — | — | 21 |
| 22 | 192.168.0.50 | 192.168.0.10 | UPDATE PROGRAM | 10 | — | — | F11==1 | 22 |
| 23 | 192.168.0.10 | 192.168.0.51 | ... | ... | ... | ... | — | 23 |
| 24 | 192.168.0.51 | 192.168.0.10 | ... | ... | ... | ... | F12==1 | 24 |

FIG. 6

| OPERATION STATE | NUMBER OF RULES | INDEX ||||||
|---|---|---|---|---|---|---|---|
| | | \multicolumn{6}{c}{RULE NUMBER} ||||||
| STOPPED 301 | 4 | 0 | 1 | 2 | 3 | | |
| | | 1 | 3 | 2 | 4 | | |
| ACTIVATION 302 | 4 | 0 | 1 | 2 | 3 | | |
| | | 5 | 7 | 6 | 8 | | |
| UNDER CONTROL 303 | 6 | 0 | 1 | 2 | 3 | 4 | 5 |
| | | 9 | 11 | 13 | 10 | 12 | 14 |
| DEACTIVATION 304 | 4 | 0 | 1 | 2 | 3 | | |
| | | 15 | 17 | 16 | 18 | | |
| MAINTENANCE 305 | 6 | 0 | 1 | 2 | 3 | 4 | 5 |
| | | 19 | 21 | 23 | 20 | 22 | 24 |

| ACTION NUMBER | TIMER OPERATION | FLAG OPERATION |
|---|---|---|
| 1 | T1=0 | F1=1 |
| 2 | | F1=0 |
| 3 | | F2=1 |
| 4 | | F2=0 |
| 5 | | F3=1 |
| 6 | | F3=0 |
| 7 | | F4=1 |
| 8 | | F4=0 |
| 9 | T2=0 | F5=1 |
| 10 | | F5=0 |
| 11 | T3=0 | F6=1 |
| 12 | | F6=0 |
| 13 | | F7=1 |
| 14 | | F7=0 |
| 15 | | F8=1 |
| 16 | | F8=0 |
| 17 | | F9=1 |
| 18 | | F9=0 |
| 19 | T4=0 | F10=1 |
| 20 | | F10=0 |
| 21 | | F11=1 |
| 22 | | F11=0 |
| 23 | | F12=1 |
| 24 | | F12=0 |

| OPERATION STATE | TRANSMISSION SOURCE | TRANSMISSION DESTINATION | INDEX HEAD NUMBER | NUMBER OF SEARCHES |
|---|---|---|---|---|
| STOPPED 301 | 192.168.0.10 | 192.168.0.50 | 0 | 2 |
|  | 192.168.0.50 | 192.168.0.10 | 2 | 2 |
| ACTIVATION 302 | 192.168.0.10 | 192.168.0.50 | 0 | 2 |
|  | 192.168.0.50 | 192.168.0.10 | 2 | 2 |
| UNDER CONTROL 303 | 192.168.0.10 | 192.168.0.50 | 0 | 3 |
|  | 192.168.0.50 | 192.168.0.10 | 3 | 3 |
| DEACTIVATION 304 | 192.168.0.10 | 192.168.0.50 | 0 | 2 |
|  | 192.168.0.50 | 192.168.0.10 | 2 | 2 |
|  | 192.168.0.10 | 192.168.0.50 | 0 | 2 |
| MAINTENANCE 305 | 192.168.0.10 | 192.168.0.51 | 2 | 1 |
|  | 192.168.0.50 | 192.168.0.10 | 3 | 2 |
|  | 192.168.0.51 | 192.168.0.10 | 5 | 1 |

DATA DETERMINATION DEVICE, DATA DETERMINATION METHOD, AND DATA DETERMINATION PROGRAM

TECHNICAL FIELD

The present invention relates to a data determination device, a data determination method, and a data determination program, and more particularly, to a data determination device, data determination method, and data determination program for detecting illegal intrusion into a network.

BACKGROUND ART

In recent years, an increasing number of industrial control systems have been connected to a network. As a result, an increasing number of those systems are subjected to cyber-attacks. Thus, the industrial control system employs the following intrusion detection system in order to detect intrusion into a network by a cyberattack.

A related-art intrusion detection system defines allowed communication by setting a protocol and a pair of a transmission destination address and a transmission source address based on the fact that network communication within an industrial control system is performed in a fixed manner. Then, the intrusion detection system determines that communication other than the allowed communication is abnormal, to thereby implement a measure of detecting intrusion by an unknown attack through whitelisting (refer to Patent Literatures 1 and 2, for example).

Further, there is proposed a method involving defining an allowed communication sequence and managing communication states such as "disconnected", "connected", and "abnormal processing", in each communication sequence (refer to Patent Literature 2, for example).

Further, there is proposed a method involving describing a communication transaction as a state machine to enable a communication order to be described as a whitelist (refer to Non Patent Literature 1, for example).

Further, there is a problem of increasing a search speed due to an increase in number of detection rules. Regarding a deep packet inspection (DPI) method involving matching of packet data, there are proposed a technique (refer to Non Patent Literature 2, for example) of using a Bloom filter and a technique (refer to Non Patent Literatures 3 and 4, for example) of using a multi-core processor.

CITATION LIST

Patent Literature

[PTL 1] JP 4688420 B2
[PTL 2] JP 2001-034553 A

Non Patent Literature

[NPL 1] Niv Goldenberg, Avishai Wool, "Accurate Modeling of Modbus/TCP for Intrusion Detection in SCADA Systems", International Journal of Critical Infrastructure Protection, Volume 6, Issue 2, June 2013.

[NPL 2] Sarang Dharmapurikar, Praveen Krishnamurthy, Todd Sproull, John Lockwood, "Deep Packet Inspection Using Parallel Bloom Filters.", In Proc. 11th Symp. High Performance Interconnects (HOTI'03), pages 44-51, Stanford, Calif., 2003.

[NPL 3] Marco Danelutto, Luca Deri, Daniele De Sensi, Massimo Torquati, "Deep Packet Inspection on Commodity Hardware using FastFlow", Advances in Parallel Computing, Volume 25, Pages 92-99, January 2014.

[NPL 4] Cheng-Hung Lin, Sheng-Yu Tsai, Chen-Hsiung Liu, Shih-Chieh Chang, Jyuo-Min Shyu, "Accelerating String Matching Using Multi-Threaded Algorithm on GPU", Global Telecommunications Conference (GLOBECOM 2010), Pages: 1-5, December 2010, IEEE.

SUMMARY OF INVENTION

Technical Problem

In many cases, the related-art whitelisting described in, for example, Patent Literatures 1 and 2 determines whether or not the packet itself matches the rule. However, in recent years, there has been an attack, for example, Stuxnet, which targets an industrial control system and cannot be detected by determination of a single packet. In order to detect those attacks, it is required to include, in a detection target, the state of a system or apparatus at the time of communication and a correspondence relationship between a request and a response, for example. However, such a measure is not taken in Patent Literature 1.

The related-art technology described in Patent Literature 2 monitors communication states of the transmission source and the transmission destination, determines whether or not those communication states are communication states that follow a communication sequence defined in advance, and performs access control in accordance with a result of determination. However, in this case, when a third person performs communication in accordance with the defined communication sequence using a hacked server, this communication cannot be detected to be a cyberattack. As a result, there is a problem in that, for example, attack data for illegally rewriting a program can also be communicated.

Meanwhile, in the related-art technology described in, for example, Non Patent Literature 1, a correspondence relationship between a request and a response is also included in the detection target, and thus a cyberattack can be detected in a more sophisticated manner. However, in Non Patent Literature 1, when one detection device is used to detect communication among a plurality of devices, combinations of communication among all the devices are required to be described as a state machine, resulting in combinatorial explosion.

Further, regarding increase in search speed, a false-positive outcome may be obtained in the related-art technology described in Non Patent Literature 2, and thus an attack may be missed by whitelisting.

Further, the related-art technology described in Non Patent Literature 3 aims to achieve high-speed processing by parallelization of determination processing, and the number of determination targets itself cannot be reduced. Further, there is a problem in that the related-art technology described in Non Patent Literature 3 operates only on a processor capable of executing parallel programming.

The present invention has been made to solve the above-mentioned problems, and has an object to provide a data determination device, a data determination method, and a data determination program, which are capable of detecting invalidity of communication data at high speed and accurately while suppressing combinatorial explosion even when a third person has hacked a server and performed a cyber-attack using the server.

Solution to Problem

According to one embodiment of the present invention, there is provided a data determination device including: a flag management unit configured to store a current value of a flag set for an own device; a state management unit configured to store a current operation state of the own device transitioning between a plurality of operation states, and to cause the operation state of the own device to transition in accordance with a state transition model defining transition between the plurality of operation states depending on any one or more of an input signal from an outside and the current value of the flag stored in the flag management unit; an allowed communication list conversion unit configured to convert a detection rule, which describes a correspondence relationship between communication data indicating request communication and communication data indicating response communication to the request communication, into an allowed communication list registering in advance communication data for which communication is allowed for each of the plurality of operation states; and a determination unit configured to determine whether communication data input to the own device is communication data in the current operation state registered in the allowed communication list by using any one or more of the current operation state of the own device stored in the state management unit, the allowed communication list, and the current value of the flag stored in the flag management unit, to thereby determine whether the communication data input to the own device is normal or abnormal, wherein the allowed communication list conversion unit is configured to, when converting the detection rule into the allowed communication list: assign a flag to each of the request communication and the response communication, between which the correspondence relationship is described in the detection rule; and describe, in the allowed communication list, details of a flag operation specifying a set value to be set to the flag and a flag condition for determining whether the set value is set in the flag, in association with each other, and wherein the determination unit is configured to: set the set value in the flag in accordance with the details of the flag operation after determining that communication data on the request communication is normal; determine whether the set value is set in the flag based on the flag condition when determining whether communication data on the response communication to the request communication is normal; and determine that the communication data on the response communication is normal when the set value is set, to thereby reset the flag.

Advantageous Effects of Invention

In the data determination device according to one embodiment of the present invention, the correspondence relationship between request communication and response communication is described at the time of definition of normal communication in the allowed communication list, and thus it is possible to describe all the types of communication data without causing combinatorial explosion. Further, the correspondence relationship between request communication and response communication can be determined by setting/resetting of the flag, and whether the communication data is normal or abnormal is determined also in consideration of the correspondence relationship between request communication and response communication. Therefore, it is possible to detect that communication data is invalid even when a third person has hacked a server and performed a cyberattack using the server. Further, it is possible to search an increasing number of detection rules at high speed by defining the correspondence relationship between request communication and response communication.

BRIEF DESCRIPTION OF DRAWINGS

FIG. 3 is a diagram for illustrating an example of a state transition model stored in a state transition model storage unit of the data determination device according to the first embodiment of the present invention.

FIG. 4 is a table for showing an example of a detection rule list stored in a detection rule storage unit of the data determination device according to the first embodiment of the present invention.

FIG. 5 is a table for showing an example of an allowed communication list stored in an allowed communication list storage unit of the data determination device according to the first embodiment of the present invention.

FIG. 6 is a table for showing an example of the allowed communication list stored in the allowed communication list storage unit of the data determination device according to the first embodiment of the present invention.

FIG. 7 is a table for showing an example of the allowed communication list stored in the allowed communication list storage unit of the data determination device according to the first embodiment of the present invention.

FIG. 8 is a table for showing an example of the allowed communication list stored in the allowed communication list storage unit of the data determination device according to the first embodiment of the present invention.

DESCRIPTION OF EMBODIMENTS

First Embodiment

Figure 1:
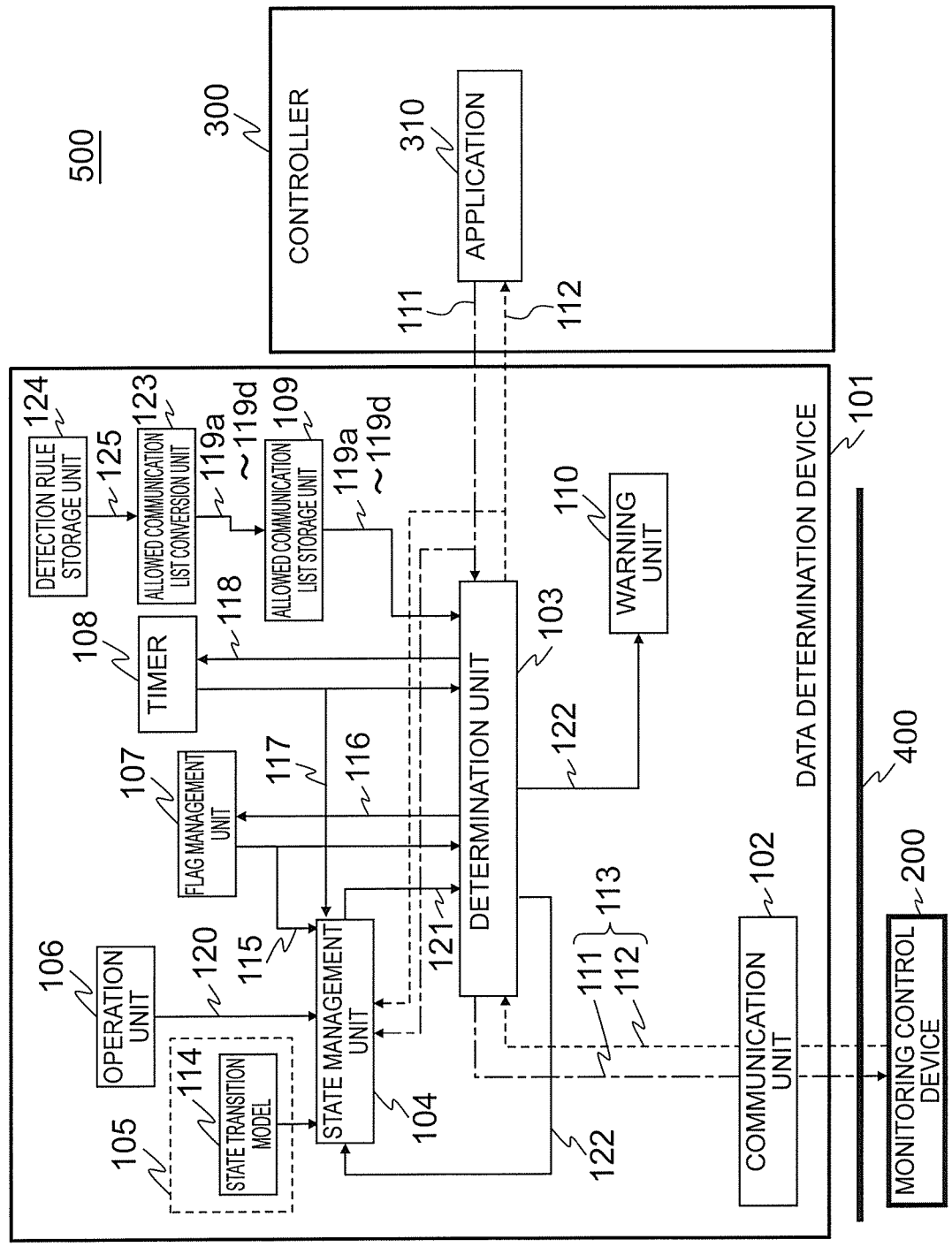
FIG. 1 is a block diagram for illustrating a configuration of a data determination device according to a first embodiment of the present invention.

With reference to FIG. 1 and FIG. 3 to FIG. 8, a description is given of a configuration of a data determination device 101 according to a first embodiment of the present invention. As illustrated in FIG. 1, the description is given of a case in which the data determination device 101 according to the first embodiment is connected to a monitoring control device 200 and a controller 300, and sets communication data communicated between the monitoring control device 200 and the controller 300 in both directions as a determination target. In the following, data to be transmitted from the controller 300 to the monitoring control device 200 is referred to as "transmission data 111", and data to be received by the controller 300 from the monitoring control device 200 is referred to as "reception data 112". Further, a system including the data determination device 101, the monitoring control device 200, and the controller 300 is referred to as "data determination system 500".

As illustrated in FIG. 1, the data determination device 101 is connected to a network 400. The data determination device 101 is connected to the monitoring control device 200 via the network 400. Further, the data determination device 101 is connected to the controller 300. The data determination device 101 plays an intermediary role of communication data transmitted between the monitoring control device 200 and the controller 300. Further, the data determination device 101 determines whether or not the communication data is due to an illegal access. In this manner, the data determination device 101 serves as an intrusion detection device and an intrusion detection system, which are configured to detect an attack that intrudes into the network 400.

This description is given of an exemplary case in which the controller 300 is included in the industrial control system. However, this description is not limited thereto, and the controller 300 can be included in any system. The controller 300 includes an application 310. The application 310 transmits the transmission data 111 to the monitoring control device 200 via the data determination device 101. Further, the application 310 receives the reception data 112 from the monitoring control device 200 via the data determination device 101. The transmission data 111 and the reception data 112 are determination targets of the data determination device according to the first embodiment, and thus in the following, the reception data 112 and the transmission data 111 are collectively referred to as "communication determination data 113".

Meanwhile, the monitoring control device 200 is a server configured to monitor and control the industrial control system including the controller 300.

The data determination device 101 transmits, to the controller 300, the reception data 112 received from the monitoring control device 200 via the network 400. Further, the data determination device 101 transmits the transmission data 111 transmitted by the application 310 of the controller 300 to the monitoring control device 200 via the network 400. The data determination device 101 performs data determination processing of detecting offensive intrusion into the network 400 in the process of playing an intermediary role of communication of the reception data 112 and the transmission data 111.

As illustrated in FIG. 1, the data determination device 101 includes a state management unit 104, a timer 108, an allowed communication list storage unit 109, an allowed communication list conversion unit 123, a detection rule storage unit 124, a determination unit 103, a communication unit 102, a warning unit 110, an operation unit 106, a flag management unit 107, and a state transition model storage unit 105. However, the timer 108, the allowed communication list storage unit 109, the detection rule storage unit 124, the warning unit 110, and the operation unit 106 are not always required to be provided.

The state transition model storage unit 105 stores a state transition model 114 for transitioning between operation states among a plurality of operation states in accordance with acquisition information acquired by the own device. The own device is the data determination device 101 itself. The acquisition information is an element that transitions the state of the data determination device 101. The acquisition information contains communication data acquired from the outside through communication, an operation signal 120 indicating reception of an input operation into the own device, a timer current value 117 output from the timer 108, and a flag current value 115 output from the flag management unit 107.

FIG. 3 is an illustration of an example of the state transition model 114. FIG. 3 is merely one example, and the state transition model 114 is not always required to be as illustrated in FIG. 3.

In FIG. 3, reference numerals 301 to 308 denote examples of the plurality of operation states of the data determination device 101. In FIG. 3, the "stopped" 301, the "activation" 302, the "under control" 303, the "deactivation" 304, the "maintenance" 305, the "activation" 306, the "trial run" 307, and the "deactivation" 308 are given as the examples of the operation state.

Further, between one operation state and another operation state in FIG. 3, there is illustrated an example of transition of states between transition states. For example, in the example of FIG. 3, the data determination device 101 transitions to the "stopped" 301 at the time of power on. Further, when "start activation" is executed at the "stopped" 301, the data determination device 101 transitions to the "activation" 302. Further, when "finish activation" is executed at the "activation" 302, the data determination device 101 transitions to the "under control" 303. Those "start activation", "finish activation", and other states are information on transition of states between operation states. A specific transition from one operation state to another operation state is defined in the state transition model 114 in advance. Thus, transition from the "stopped" 301 to the "activation" 302 is defined, and thus the "stopped" 301 does not transition to any of the other operation states 303 to 307.

Further, a state transition command signal for instructing state transition, for example, "start activation" is the operation signal 120 input into the operation unit 106 by the user, the reception data 112 or the transmission data 111 received by the data determination device 101, the flag current value 115 from the flag management unit 107, or the timer current value 117 from the timer 108.

In this manner, the state transition model 114 contains information on each of the operation states 301 to 307 and information on transition of states between those operation states.

When at least one of the operation signal 120 input into the operation unit 106 by the user, the reception data 112 or the transmission data 111 received by the data determination device 101, the flag current value 115 from the flag management unit 107, or the timer current value 117 from the timer 108 is input, the state management unit 104 causes the operation state of the own device, namely, the data determination device 101 to transition in accordance with the state transition model 114, and holds the latest operation state.

The allowed communication list storage unit 109 stores allowed communication lists 119*a* to 119*d* as an allowed communication rule 141. FIG. 5 to FIG. 8 are examples of the allowed communication lists 119*a* to 119*d*. FIG. 5 to FIG. 8 are merely examples, and the allowed communication lists 119*a* to 119*d* are not always required to be as shown in FIG. 5 to FIG. 8.

The allowed communication list 119*a* shown in FIG. 5 contains items of a rule number, transmission source information, transmission destination information, a command type, a data size, a set data range, a timer condition, a flag condition, and an action number.

The allowed communication list 119b shown in FIG. 6 contains items of an operation state, a number of rules, an index, and a rule number.

The allowed communication list 119c shown in FIG. 7 contains items of an action number, a timer operation, and a flag operation.

The allowed communication list 119d shown in FIG. 8 contains items of an operation state, transmission source information, transmission destination information, an index head number, and a number of searches.

The items in the allowed communication lists 119a to 119d are not limited to those examples, and can be set in any manner.

Further, details of the allowed communication lists 119a to 119d are described later.

The detection rule storage unit 124 stores a detection rule list 125. The detection rule list 125 registers in advance a correspondence relationship between request communication and response communication responding thereto. The detection rule list 125 describes the correspondence relationship between request communication and response communication in order to determine whether communication data is normal or abnormal based on the correspondence relationship between request communication and response communication. FIG. 4 is an illustration of an example of the detection rule list 125. FIG. 4 is merely one example, and the detection rule list is not always required to be as shown in FIG. 4.

In the example of FIG. 4, the detection rule list 125 includes 24 detection rules 126.

Each detection rule 126 is assigned with a unique rule number. Each detection rule 126 contains items of an operation state, a rule number, transmission source information, transmission destination information, a rule number (hereinafter referred to as "request rule number") of request communication, a rule number (hereinafter referred to as "response rule number") of response communication, a command type, an upper limit value of a data size, a set data range, and a command execution period. Each detection rule 126 may further contain items such as the timer current value and the flag current value. Those items are set in any manner, and other items may be employed as long as such items enable identification of communication data.

As shown in FIG. 4, in the detection rule 126, when the operation state is the "stopped" 301, only the rule numbers 1 to 4 are allowed, and the other rules are not allowed. Similarly, when the operation state is the "activation" 302, only the rule numbers 5 to 8 are allowed, and the other rules are not allowed. The same holds true when the operation state is the "under control" 303, the "deactivation" 304, and the "maintenance" 305. In this manner, the detection rule list 125 registers, for each operation state, the correspondence relationship between request communication and response communication for allowed communication data.

Further, the detection rule list 125 represents a correspondence relationship between request communication and response communication by a pair of the request rule number and the response rule number. A plurality of response rule numbers may be set for one request rule number. In contrast, a plurality of request rule numbers may be set for one response rule number.

Specifically, regarding the correspondence relationship between request communication and response communication, the detection rule 126 having a rule number "1" of the "stopped" 301 in the detection rule list 125 of FIG. 4 specifies request communication for "device state acquisition" from a transmission source "192.168.0.10" to a transmission destination "192.168.0.50". The response rule number for the request communication is "2". That is, response communication for the request communication is the detection rule 126 having a rule number "2" of the "stopped" 301. The response communication is response communication for transmitting information on the device state from the transmission source "192.168.0.50" to the transmission destination "192.168.0.10", which has requested "device state acquisition". "1±0.1" is set in the detection rule 126 having the rule number "1" as a command execution period. Thus, it is found that request communication for "device state acquisition" is repeatedly transmitted from the transmission source "192.168.0.10" to the transmission destination "192.168.0.50" in a period of "1±0.1" seconds. In this manner, in each detection rule 126, when the relevant communication is request communication, the rule number of response communication corresponding thereto is registered as "response rule number", and in contrast, when the relevant communication is response communication, the rule number of request communication corresponding thereto is registered as "request rule number". In this manner, all the correspondence relationships between request communication and response communication are registered for each operation state in the detection rule list 125.

Further, more specifically, request communication having a rule number "5" and response communication having a rule number "6" are paired with each other in the "activation" 302 row of the detection rule list 125. A command for those detection rules is "device activation". Further, the correspondence relationship between request communication and response communication is defined such that request communication having a rule number "7" and response communication having a rule number "8" are paired with each other, request communication having a rule number "9" and response communication having a rule number "10" are paired with each other, request communication having a rule number "11" and response communication having a rule number "12" are paired with each other, and on and on.

In this manner, the correspondence relationship between request communication and response communication is described by the rule number in the detection rule list 125. That is, the detection rule list 125 describes the correspondence relationship to detect the correspondence relationship between communication data indicating request communication and communication data indicating response communication corresponding thereto.

The allowed communication list conversion unit 123 generates the allowed communication lists 119a to 119d shown in FIG. 5 to FIG. 8 from the detection rule list 125.

The allowed communication list conversion unit 123 first assigns one or more flags to request communication and response communication between which a correspondence relationship is described in the detection rule. Then, details of a flag operation for specifying a value to be set to the flag and a flag condition for determining whether or not that value is set in the flag are described for each request communication and response communication in the allowed communication lists 119a and 119c in association with each other. A correspondence relationship among the rule number, the action number, and the flag condition is described for each piece of communication data in the allowed communication list 119a of FIG. 5. Further, a correspondence relationship between the action number and the flag operation is described in the allowed communication list 119c of FIG. 7. Thus, a correspondence relationship between details of the flag operation and the flag condition can be grasped because those action numbers are common by referring to the allowed communication lists 119*a* and 119*c* in combination with each other. In the first embodiment, the allowed communication lists 119*a* and 119*c* are separated from each other, but those lists may be combined as one allowed communication list.

Further, the allowed communication list conversion unit 123 sorts pieces of communication data in the allowed communication list in priority order of operation state, transmission source, and transmission destination, or in priority order of operation state, transmission destination, and transmission source, and then generates the allowed communication list 119*b* in which the respective pieces of communication data are assigned with the sorted orders for each operation state as indices.

Further, the allowed communication list conversion unit 123 generates the allowed communication list 119*d* for representing the index head number, which indicates a head pointer for specifying a search range of the sorted allowed communication list to be referred to, and the number of searches contained in the search range, based on the operation state, the transmission source information, and the transmission destination information.

Now, a description is given of an operation of the allowed communication list conversion unit 123 according to the first embodiment with reference to FIG. 4 to FIG. 8.

When the detection rule list 125 shown in FIG. 4 is given, the allowed communication list conversion unit 123 represents the correspondence relationship between the request rule number and the response rule number by ON/OFF of the flag.

For example, when the response rule number of request communication having the rule number "1" is "2" in the detection rule list 125, the allowed communication list conversion unit 123 recognizes that the rule number "1" and the rule number "2" are associated with each other. Thus, a flag F1 is assigned to the rule number "1" and the rule number "2". When the rule having the rule number "1" in the allowed communication list 119*a* is satisfied, the allowed communication list conversion unit 123 describes, as an action of the request communication, "F1=1" to set the flag F1 to "1" as the "flag operation" having an action number "1" in the allowed communication list 119*c* of FIG. 7. This is ON of the flag. Next, the allowed communication list conversion unit 123 describes "F1==1" as the flag condition so as to allow the communication when the flag F1 is set to 1 in communication data having the rule number "2" in the allowed communication list 119*a* of FIG. 5. With this, in a case where communication data having the rule number "2" is the determination target, communication of the communication data is allowed only when the operation state is "stopped 301", the transmission source information is "192.168.0.50", the transmission destination information is "192.168.0.10", the command type is "device state acquisition", and the flag F1 is set to "1" in the flag current value 115 of the flag management unit 107. That is, when communication data having the rule number "2" is transmitted under a state in which the flag F1 is not set to "1", it can be determined that the communication data is due to an illegal access and communication is not to be allowed.

Further, when the rule having the rule number "2" in the allowed communication list 119*a* is satisfied, the allowed communication list conversion unit 123 describes, as an action of the response communication, "F1=0" to set the flag F1 to "0" as the "flag operation" having an action number "2" in the allowed communication list 119*c* of FIG. 7. This is OFF of the flag.

In this manner, the allowed communication list conversion unit 123 represents the correspondence relationship between the request rule number and the response rule number by ON/OFF of the flag in the allowed communication lists 119*a* to 119*d*.

In this manner, when the determination unit 103 described later determines that communication data indicating request communication is normal at the time of determination of the communication data, the determination unit 103 sets the current value of the flag of the flag management unit 107 in accordance with details of the flag operation described in the allowed communication list as an action of the request communication. In this case, for example, the flag F1 is set to 1, and the flag F1 is set to ON.

When determining communication data indicating response communication corresponding to the request communication, the determination unit 103 determines whether or not the current value of the flag F1 matches "1", which is the value of the flag F1 updated as an action of request communication, based on the flag condition described in the allowed communication list, to thereby determine whether or not the response communication correctly corresponds to previous request communication to determine whether or not the response communication is normal.

When the determination unit 103 determines that the response communication is normal, the determination unit 103 resets the current value of the flag of the flag management unit 107 in accordance with details of the flag operation described in the allowed communication list as an action of the response communication. That is, in this case, for example, the flag F1 is set to 0.

In this manner, in the first embodiment, the determination unit 103 can confirm the correspondence relationship between request communication and response communication based on ON/OFF of the flag.

Further, the allowed communication list conversion unit 123 generates the allowed communication list 119*b* of FIG. 6, which indicates the number of rules to be applied in each operation state and rule numbers, for each operation state. The allowed communication list conversion unit 123 sorts pieces of communication data in priority order of operation state, transmission destination, and transmission source based on priorities of the operation state, the transmission source information, and the transmission destination information at the time of generation of the allowed communication list 119*b* of FIG. 6. In the allowed communication list 119*b* of FIG. 6, pieces of communication data in the allowed communication list 119*a* of FIG. 1 are sorted in priority order of operation state, transmission source, and transmission destination, and the sorted orders are assigned to respective pieces of communication data as indices for each operation state. That is, for example, in the "stopped" 301 row, pieces of communication data are sorted in order of rule numbers 1, 3, 2, and 4, and are assigned with index numbers 0, 1, 2, and 3, respectively.

Further, the allowed communication list conversion unit 123 generates the allowed communication list 119*d* of FIG. 8 for identifying the index head number and number of searches in the allowed communication list 119*b* to be referred to, based on the transmission source information and the transmission destination information. In the allowed communication list 119*d* of FIG. 8, the index head number is "2" and the number of searches is "2" in the "stopped" 301 row when the transmission source information is "192.168.0.50" and the transmission destination information is "192.168.0.10". Thus, when the determination unit 103 refers to the allowed communication list 119*b* of FIG. 6 based on the index head number "2" and the number of searches "2", it is found that an index starting with "2" is a head pointer of the search range and two searches including the head pointer is the search range in the sorted allowed communication list. In this manner, the determination unit 103 identifies the search range, and compares communication data of the allowed communication list corresponding to the search range and communication data serving as the determination target with each other, to thereby determine whether the communication data serving as the determination target is normal or abnormal.

Further, the allowed communication list conversion unit 123 may rearrange the rule numbers in the allowed communication list 119b of FIG. 6 in accordance with reference frequencies of the allowed communication rule 141 described in the allowed communication list 119a of FIG. 5. At this time, the rule numbers are rearranged so that a correspondence relationship between the transmission source information and the transmission destination information is maintained. For example, in the rule for the "maintenance" 305, the rule numbers 19 and 21 indicate rules of the same transmission source and transmission destination, and are thus allowed to be rearranged. However, the rule numbers 21 and 23 indicate different transmission sources/transmission destinations, and thus are not allowed to be rearranged.

In the first embodiment, in this manner, a description has been given of a case in which the allowed communication list conversion unit 123 generates the four allowed communication lists 119a to 119d. However, the description is not limited thereto, and only the allowed communication lists 119a and 119c may be generated among those lists. When the allowed communication lists 119b and 119d are generated, the search range can be narrowed down, and thus it is possible to shorten the period of time of determination processing by the determination unit 103.

Referring back to FIG. 1, the communication unit 102 is connected to the monitoring control device 200 via the network 400. The communication unit 102 receives the reception data 112 from the monitoring control device 200 via the network 400, and outputs the received reception data 112 to the determination unit 103. Further, the communication unit 102 receives the transmission data 111 from the determination unit 103, and transmits the received transmission data 111 to the monitoring control device 200 via the network 400. The communication unit 102 serves as a network input/output unit.

The state management unit 104 manages the operation state of the data determination device 101 based on the state transition model 114. The state transition model 114 is set in advance, and is stored in a storage area of the data determination device 101. The storage area is constructed by, for example, a memory 903 or an auxiliary storage device 902 of FIG. 9 described later. The state management unit 104 transitions the operation state of the own device in accordance with the state transition model 114 when at least one of the operation signal 120 from the operation unit 106, the transmission data 111 from the controller 300, the reception data 112 from the monitoring control device 200, and the timer current value from the timer 108 is input.

Further, when the communication determination data 113 is determined to satisfy the allowed communication rule 141 by the determination unit 103, that is, when the communication determination data 113 is determined to be normal by the determination unit 103, the state management unit 104 transitions the operation state of the own device based on the state transition model 114. Further, when the communication determination data 113 is determined not to satisfy the allowed communication rule 141 by the determination unit 103, that is, when the communication determination data 113 is determined to be abnormal by the determination unit 103, the state management unit 104 may transition the operation state of the own device to an abnormal state. The state management unit 104 may simply transition the operation state when the communication determination data 113 is determined to be normal. As described above, the state management unit 104 holds the current operation state 121 of the data determination device 101 being the own device.

The operation unit 106 includes, for example, a button, a touch panel, a keyboard, and a mouse to be operated by a user. The operation unit 106 outputs the operation signal 120 indicating reception of an operation to the own device when there is input of an operation from the user.

The timer 108 measures a period of time in which the operation state of the own device has continued. A period of time in which the operation state is continued is set in advance for each operation state. When the operation state has transitioned, the continuation period of that operation state is set in the timer 108. The timer 108 subtracts a fixed value from the set value of the continuation period every fixed period (e.g., 1 ms), and ends subtraction when the value becomes 0 to output the timer current value 117 with the value of "0" as an end signal. Further, the timer 108 outputs the current value of the timer 108 as the timer current value 117 in response to requests from the determination unit 103 and the state management unit 104. The continuation period is not required to be set in advance for all the operation states, and the continuation period may be set only for a specific operation state.

The flag management unit 107 holds a flag set value 116 input from the determination unit 103, and outputs the flag current value 115 to the determination unit 103 and the state management unit 104.

The determination unit 103 acquires the reception data 112 from the communication unit 102 and the transmission data 111 from the application 310 as the communication determination data 113. Further, the determination unit 103 acquires the operation state of the own device held by the state management unit 104 as the current operation state 121. Further, the determination unit 103 acquires the timer current value 117 from the timer 108, and acquires the flag current value 115 from the flag management unit 107. The determination unit 103 uses the current operation state 121, the timer current value 117, the flag current value 115, and the allowed communication lists 119a to 119d stored in the allowed communication list storage unit 109, to determine whether or not the communication determination data 113 satisfies the allowed communication rule 141 in the current operation state 121.

The determination unit 103 first extracts the transmission source information and the transmission destination information from the reception data 112 or the transmission data 111. Next, the determination unit 103 uses the extracted transmission source information, the transmission destination information, and the current operation state 121 acquired from the state management unit 104 to identify the index head number and the number of searches from the allowed communication list 119d of FIG. 8. The determination unit 103 identifies the search range to be referred to by the identified index head number and number of searches based on the allowed communication list 119b of FIG. 6, and extracts rule numbers corresponding to the search range. For example, when the communication determination data 113 with the transmission source information of 192.168.0.50 and the transmission destination information of 192.168.0.10 is to be determined under the state of the operation state being the "stopped" 301, the determination unit 103 extracts the index head number "2" from the allowed communication list 119*d* of FIG. 8, and extracts the number of searches "2". Then, the determination unit 103 extracts, from the allowed communication list 119*b* of FIG. 6, the rule number "2" of a rule starting with an index number of "2" in the "stopped" 301 row of the operation state, and further extracts the rule number "2" and a rule number "4" adjacent thereto based on information of the number of searches "2". In this manner, the determination unit 103 determines whether or not the communication determination data 113 satisfies the allowed communication rule 141 of any one of the rule numbers "2" and "4" in the allowed communication list 119*a* of FIG. 5.

In this manner, the determination unit 103 determines whether or not the communication determination data 113 satisfies the allowed communication rule 141. When the determination unit 103 determines that the communication determination data 113 satisfies the allowed communication rule 141, the determination unit 103 determines that the communication determination data 113 is normal, and executes an action corresponding to the action number of the satisfied rule number described in the allowed communication rule 141. For example, when the communication determination data 113 satisfies the allowed communication rule 141 with the rule number 9, the determination unit 103 extracts an action number "9" from the allowed communication rule 141 of the rule number 9 in the allowed communication list 119*a* of FIG. 5. Then, the determination unit 103 executes an action described in the action number 9 of the allowed communication list 119*c* of FIG. 7. That is, the determination unit 103 substitutes "0" into the timer value T2 of the timer 108 based on details of the "timer operation" of the action number 9 in the allowed communication list 119*c* of FIG. 7, and sets a flag F5 of the flag management unit 107 to "1" based on details of the "flag operation" of the action number 9.

Meanwhile, when it is determined that the communication determination data 113 does not satisfy the allowed communication rule 141, the determination unit 103 determines that the communication determination data 113 is abnormal, and cuts off communication between the controller 300 and the monitoring control device 200. Further, the determination unit 103 outputs a determination result 122 indicating that the communication determination data 113 is abnormal to the warning unit 110.

When the determination result 122 indicating that the communication determination data 113 is abnormal is input from the determination unit 103, the warning unit 110 outputs a warning for notifying the user of the abnormality. That is, the warning unit 110 outputs a warning when the determination result 122 is abnormal. A warning to be issued by the warning unit 110 may be a visual warning or an auditory warning. When the warning is a visual warning, the warning unit 110 may be constructed by, for example, a lamp, and a lighting or blinking operation of that lamp may be set as a "warning". Further, when the warning is an auditory warning, the warning unit 110 may be constructed by a buzzer or a speaker, and utterance of a buzzer sound or a sound message may be set as a "warning". Further, the warning unit 110 may transmit a warning signal to another server as a "warning" via, for example, the network 400. Further, the warning unit 110 may be constructed by a display 908 of FIG. 9 described later, and the determination result 122 of the determination unit 103 may be displayed on a display screen. In this case, when the determination result 122 is normal, a message to the effect that "the determination result 122 is normal" is displayed on the display screen. Meanwhile, when the determination result 122 is abnormal, a message to the effect that "the determination result 122 is abnormal" is displayed on the display screen, and a warning is issued.

Figure 2:
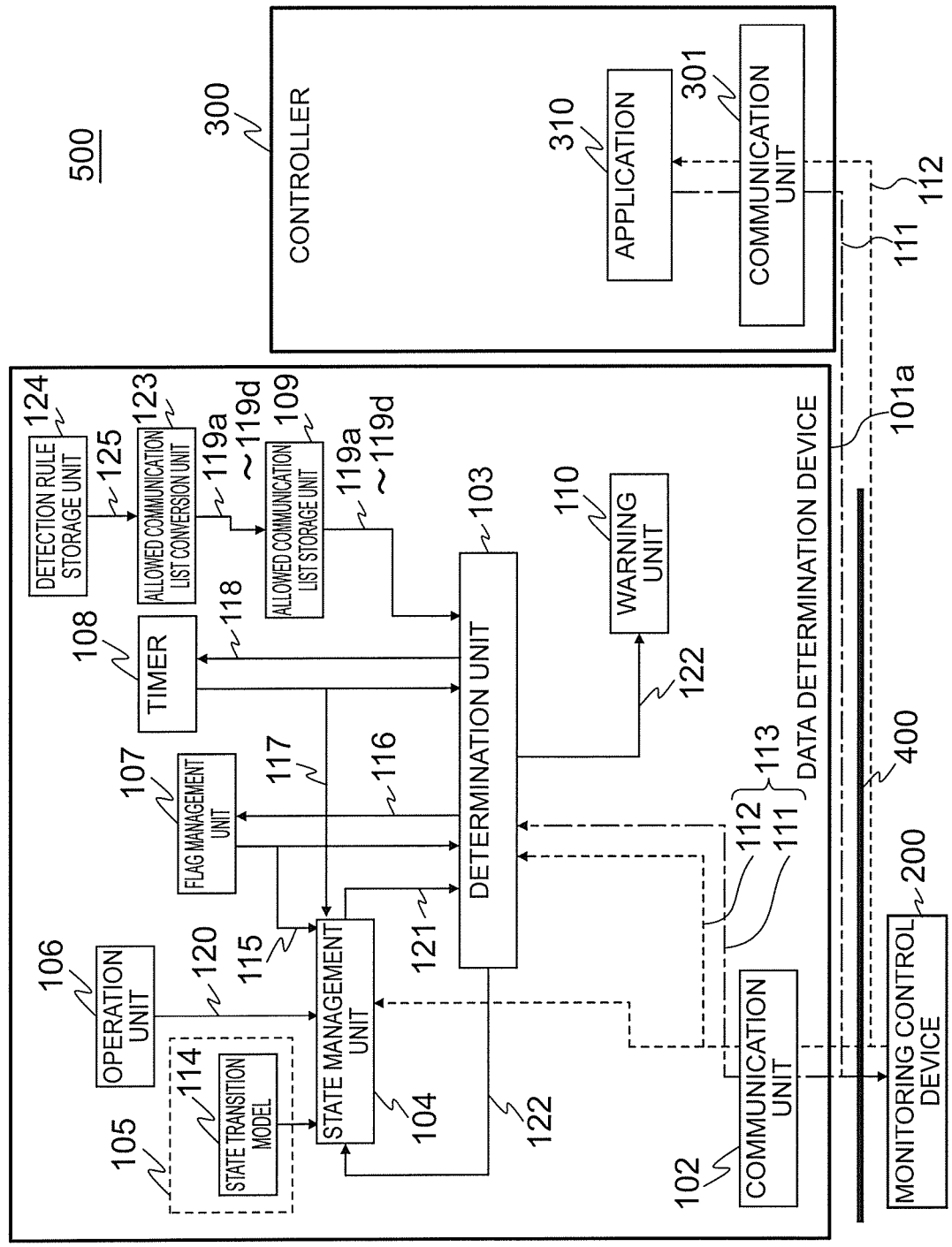
FIG. 2 is a block diagram for illustrating a configuration of a modification example of the data determination device according to the first embodiment of the present invention.

Next, a description is given of a modification example of the data determination device 101 of FIG. 1 with reference to FIG. 2. FIG. 2 is an illustration of a configuration of a data determination device 101*a* configured to perform an operation different from that of the data determination device 101 of FIG. 1.

The data determination device 101 illustrated in FIG. 1 is configured such that the determination unit 103 determines the communication determination data 113, and then communicates the reception data 112 or the transmission data 111.

Meanwhile, in the data determination device 101*a* illustrated in FIG. 2, the application 310 and the monitoring control device 200 directly communicate the transmission data 111 and the reception data 112 to/from each other without intervention of the data determination device 101*a*. This communication may be performed via the network 400, or may be performed via a dedicated line. At this time, the data determination device 101*a* uses the communication unit 102 to capture communication between the monitoring control device 200 and the application 310 to acquire the communication determination data 113, and determines the acquired communication determination data 113. However, in the data determination device 101*a* of FIG. 2, the determination unit 103 cannot cut off communication between the application 310 and the monitoring control device 200 even when the determination result 122 obtained by the determination unit 103 is abnormal. Meanwhile, it is possible to notify the user of an abnormality by a warning issued by the warning unit 110, and thus the user, who is warned of an abnormality, can perform some measure for an illegal attack by a third person.

The other configurations and operations of the data determination device 101*a* of FIG. 2 are the same as those of the data determination device 101 of FIG. 1, and thus a description thereof is omitted here.

Figure 9:
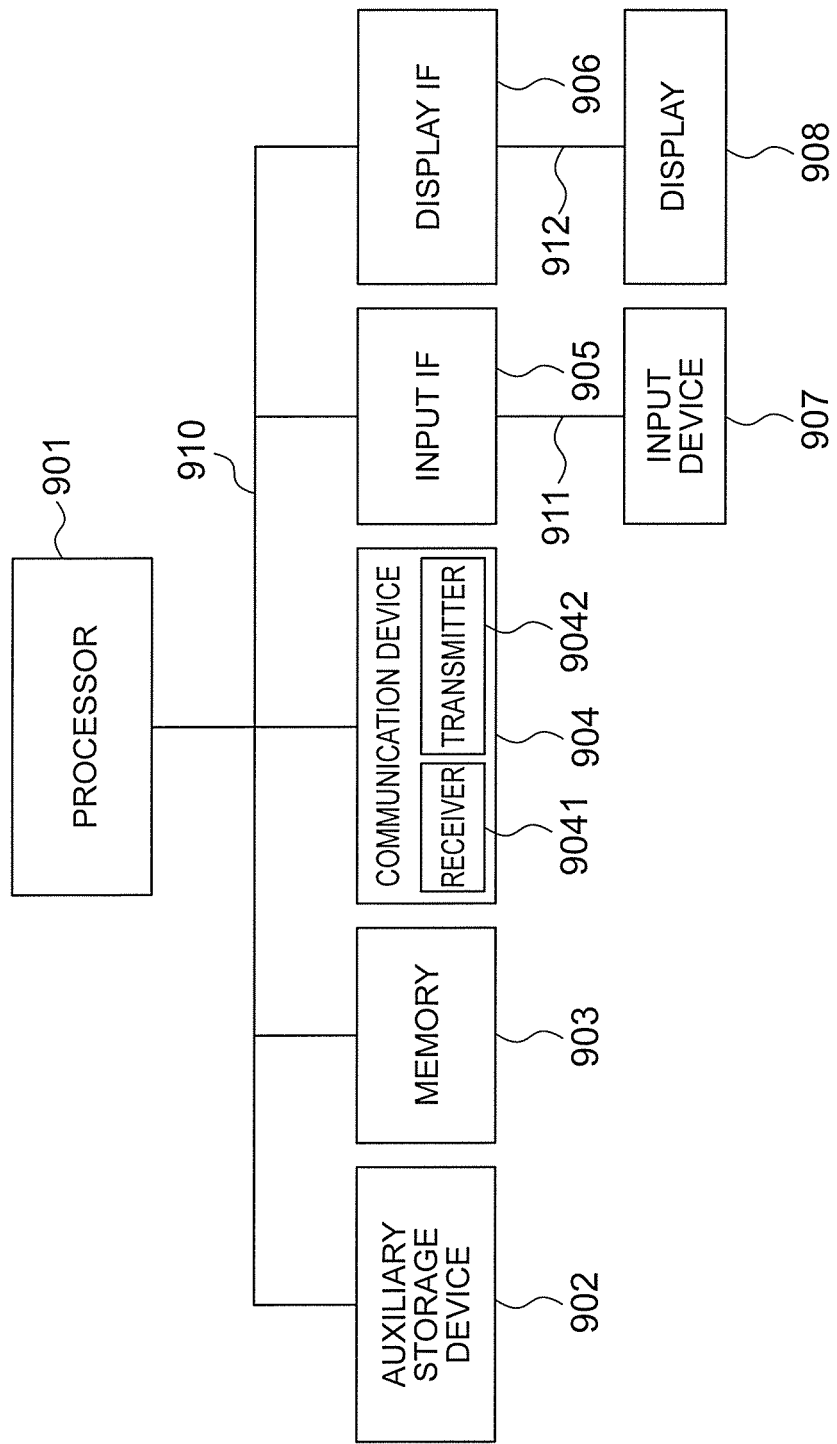
FIG. 9 is a block diagram for illustrating a hardware configuration of the data determination device according to the first embodiment of the present invention.

Next, a description is given of an exemplary hardware configuration of the data determination device 101 according to the first embodiment with reference to FIG. 9.

As illustrated in FIG. 9, the data determination device 101 is constructed by, for example, a computer.

The computer constructing the data determination device 101 includes, as hardware, a processor 901, the auxiliary storage device 902, the memory 903, a communication device 904, an input interface 905, and a display interface 906.

The processor 901 is connected to the other hardware components 902 to 906 via a signal line 910, and controls the other hardware components 902 to 906.

The input interface 905 is connected to an input device 907.

The display interface 906 is connected to the display 908.

The communication unit 102 and the operation unit 106, which are input units in the data determination device 101, are the input device 907 and the input interface 905, respectively. Further, the output unit of the data determination device 101 is the display 908 and the display interface 906. Further, although not shown in FIG. 9, the data determination device 101 also includes a hardware component constructing the warning unit 110.

The processor 901 is constructed by an integrated circuit configured to perform processing. The processor 901 is, for example, a central processing unit (CPU), a digital signal processor (DSP), or a graphics processing unit (GPU).

The auxiliary storage device 902 is constructed by, for example, a read only memory (ROM), a flash memory, and a hard disk drive (HDD).

The memory 903 is constructed by, for example, a random access memory (RAM).

The communication device 904 includes a receiver 9041 configured to receive data and a transmitter 9042 configured to transmit data. The communication device 904 is constructed by, for example, a communication chip or a network interface card (NIC).

The input interface 905 is a port to which a cable 911 of the input device 907 is to be connected. The input interface 905 is constructed by, for example, a universal serial bus (USB) terminal.

The display interface 906 is a port to which a cable 912 of the display 908 is to be connected. The display interface 906 is constructed by, for example, a USB terminal or a high definition multimedia interface (HDMI) (trademark) terminal.

The input device 907 is constructed by, for example, a mouse, a keyboard, or a touch panel.

The display 908 is constructed by, for example, a liquid crystal display (LCD).

The auxiliary storage device 902 stores programs for implementing the functions of the state management unit 104, the determination unit 103, the warning unit 110, the flag management unit 107, the timer 108, and the allowed communication list conversion unit 123 (the state management unit 104, the determination unit 103, the warning unit 110, the flag management unit 107, the timer 108, and the allowed communication list conversion unit 123 are hereinafter collectively referred to as "units"), which are illustrated in FIG. 1. The programs for implementing the functions of the "units" included in the above-mentioned data determination device 101 are also referred to as "data determination program". The programs for implementing the functions of the "units" may be one program, or include a plurality of programs. Those programs are loaded into the memory 903, read by the processor 901, and executed by the processor 901.

Further, the auxiliary storage device 902 also stores an operating system (OS). Then, at least apart of the OS is loaded into the memory 903, and the processor 901 executes the programs for implementing the functions of the "units" while executing the OS.

In FIG. 9, one processor 901 is illustrated, but the data determination device 101 may include the plurality of processors 901. Then, the plurality of processors 901 may execute the programs for implementing the functions of the "units" in cooperation with one another.

Further, information, data, a signal value, a variable value, and the like indicating the result of processing by the "units" are stored into the memory 903, the auxiliary storage device 902, or a register or cache memory in the processor 901 as files.

Further, the "units" may be provided as "circuitry".

Further, the "units" may be replaced by a "circuit", "processing step", "procedure", or "processing". Further, the "processing" may be replaced by a "circuit", "processing step", "procedure", or "unit".

The "circuit" and "circuitry" are concepts that not only include the processor 901 but also other types of processing circuits such as a logic IC, a gate array (GA), an application specific integrated circuit (ASIC), or a field-programmable gate array (FPGA).

Components referred to as "program products" are, for example, a storage medium or storage device having stored thereon programs for implementing the functions described as the "units", and load programs that can be read by the computer irrespective of the physical format.

Figure 10:
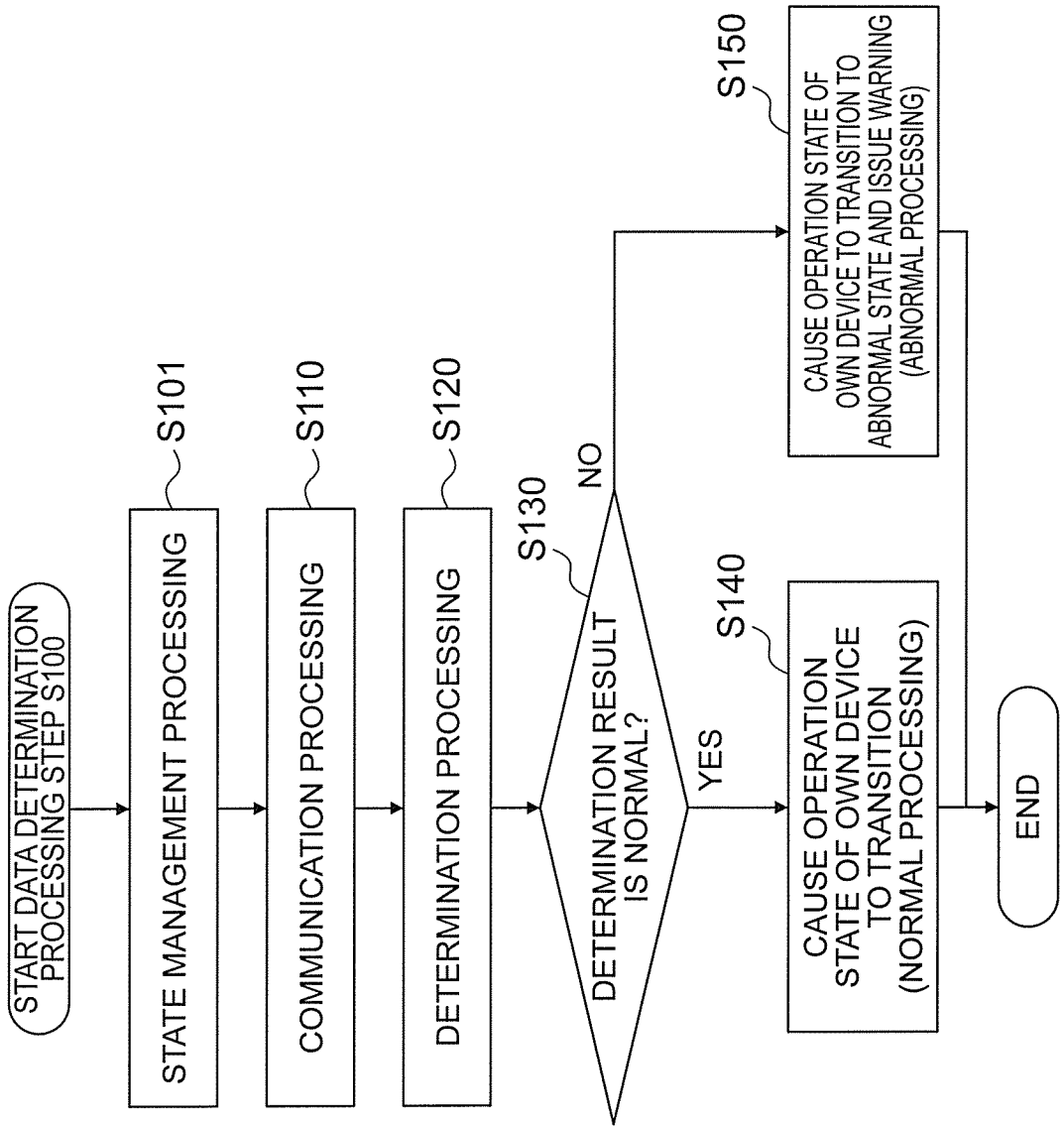
FIG. 10 is a flowchart for illustrating a flow of data determination processing in the data determination device according to the first embodiment of the present invention.

Next, a description is given of a data determination processing step S100, which is a data determination method to be performed by the data determination device 101 according to the first embodiment, with reference to FIG. 10.

As described above, the data determination device 101 includes the state transition model storage unit 105 storing the state transition model 114 and the allowed communication list storage unit 109 storing the allowed communication rule 141 as the allowed communication lists 119a to 119d.

As illustrated in FIG. 10, first, in state management processing of Step S101, the state management unit 104 executes the state management processing step S101 of holding the operation state of the own device based on the state transition model 114. That is, the state management unit 104 causes the operation state of the own device to transition and holds the latest operation state in accordance with the state transition model 114 based on any one or more of the operation signal 120, the reception data 112, the transmission data 111, the flag current value 115 from the flag management unit 107, and the timer current value 117 from the timer 108.

Next, in communication processing of Step S110, the communication unit 102 and the determination unit 103 acquire the communication determination data 113. Specifically, the communication unit 102 acquires the reception data 112, and the determination unit 103 acquires the transmission data 111.

Next, in determination processing of Step S120, the determination unit 103 acquires the reception data 112, which has been acquired by the communication processing of Step S110, from the communication unit 102, and acquires the operation state of the own device, which has been held through the state management processing of Step S101, from the state management unit 104 as the current operation state 121. Further, the determination unit 103 acquires the timer current value 117 from the timer 108, and acquires the flag current value 115 from the flag management unit 107. The determination unit 103 uses the current operation state 121, the timer current value 117, the flag current value 115, and the allowed communication lists 119a to 119d stored in the allowed communication list storage unit 109 to determine whether or not the communication determination data 113 satisfies the allowed communication rule 141 in the current operation state 121. The determination unit 103 outputs the determination result 122.

Next, in branch processing of Step S130, it is determined whether or not the determination result 122 is normal. When the determination result 122 is normal, that is, the communication determination data 113 satisfies the allowed communication rule 141, the processing proceeds to normal processing in Step S140. On the contrary, when the determination result 122 is abnormal, that is, the communication determination data 113 does not satisfy the allowed communication rule 141, the processing proceeds to abnormal processing in Step S150.

In the normal processing of Step S140, the state management unit 104 uses any one or more of the acquired communication determination data 113, timer current value 117, flag current value 115, and operation signal 120 to cause the operation state of the own device to transition in accordance with the state transition model 114.

Meanwhile, in the abnormal processing of Step S150, the state management unit 104 causes the operation state of the own device to transition to the abnormal state. Further, the warning unit 110 issues a warning based on the determination result 122 from the determination unit 103.

Figure 11:
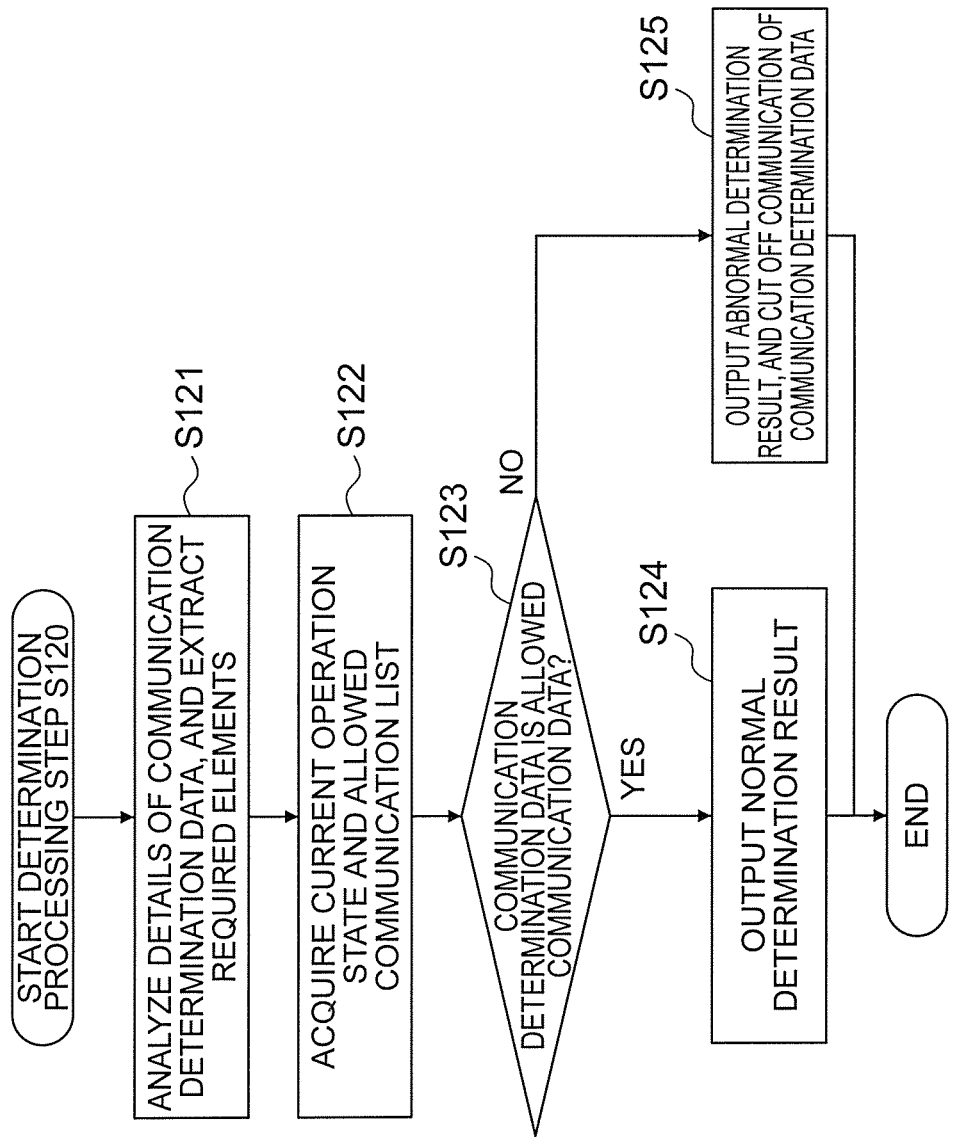
FIG. 11 is a flowchart for illustrating a flow of processing by a determination unit in the data determination device according to the first embodiment of the present invention.

Next, a description is given of determination processing to be performed by the determination unit 103 in Step S120 of FIG. 10 with reference to FIG. 11.

First, in Step S121, the determination unit 103 acquires the reception data 112 or the transmission data 111 as the communication determination data 113, and analyzes the acquired communication determination data 113. The determination unit 103 extracts elements required for determination from the communication determination data 113 by the analysis. The extracted elements are items described in the allowed communication list 119a of FIG. 5, such as the transmission source information, the transmission destination information, and the command type.

Next, in Step S122, the determination unit 103 acquires the current operation state 121 from the state management unit 104. Further, the determination unit 103 acquires the allowed communication lists 119a to 119d from the allowed communication list storage unit 109.

In Step S123, the determination unit 103 determines whether or not the communication determination data 113 is communication data that is allowed in the current operation state 121, that is, whether or not the communication determination data 113 satisfies the allowed communication rule 141, based on the current operation state 121 and the allowed communication lists 119a to 119d acquired in Step S122. As a result of determination, when the communication determination data 113 satisfies the allowed communication rule 141, the processing proceeds to Step S124. On the contrary, when the communication determination data 113 does not satisfy the allowed communication rule 141, that is, the communication determination data 113 is communication that is not allowed, the processing proceeds to Step S125.

In Step S124, the determination unit 103 outputs the determination result 122 indicating the "normality". Further, the determination unit 103 executes an action corresponding to an action number described in the satisfied allowed communication rule 141. The determination unit 103 refers to the allowed communication list 119c of FIG. 7 based on the action number to set a predetermined flag in the flag management unit 107 or set a predetermined value in the timer 108, for example.

Meanwhile, in Step S125, the determination unit 103 outputs the determination result 122 indicating the "abnormality" to the warning unit 110, and at the same time, cuts off communication of the communication determination data 113. In other cases, the determination unit 103 may simply output the determination result 122 indicating the "abnormality", and may not cut off communication of the communication determination data 113.

Figure 12:
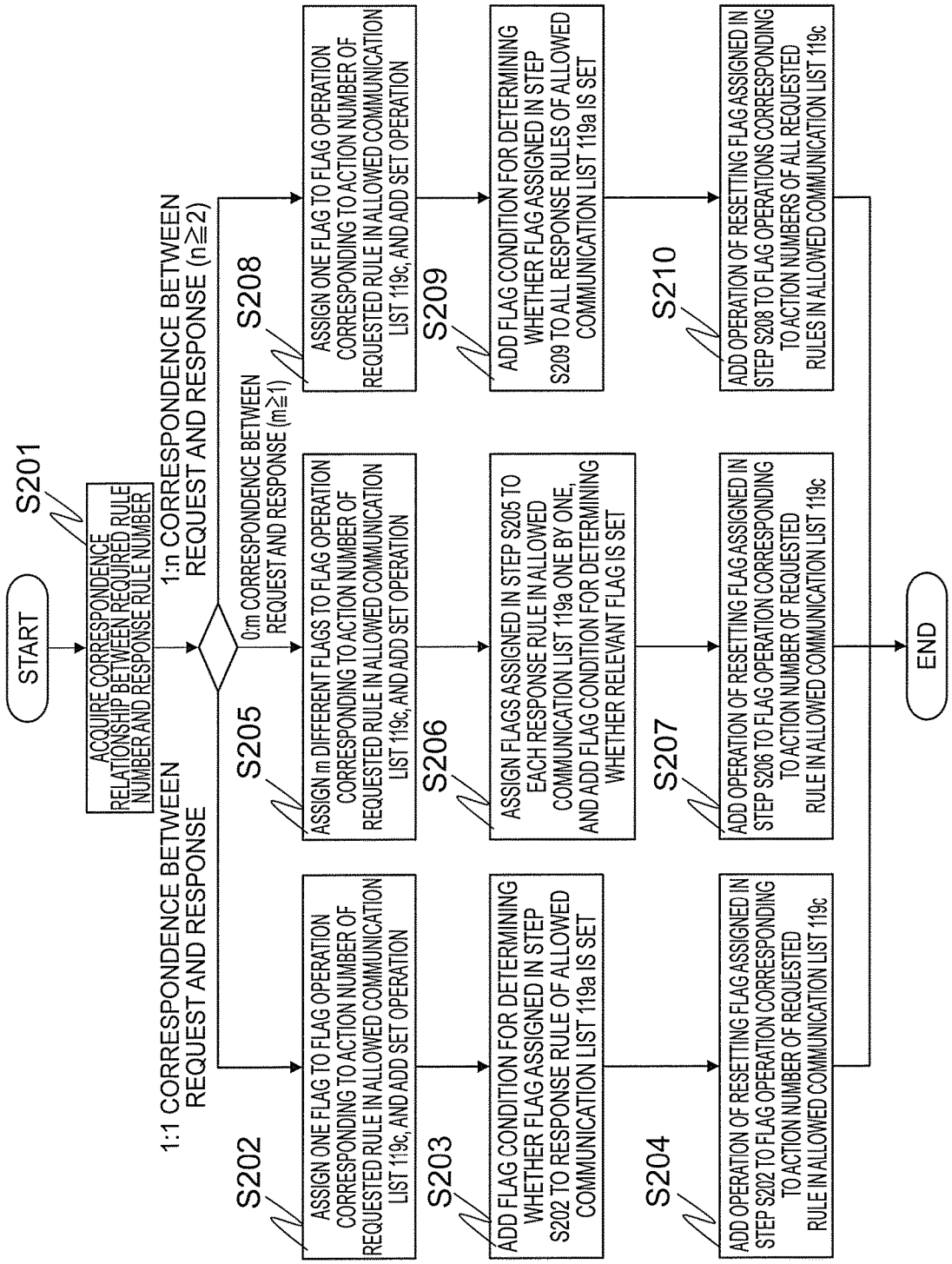
FIG. 12 is a flowchart for illustrating a flow of processing by an allowed communication list conversion unit in the data determination device according to the first embodiment of the present invention.

Next, a description is given of an operation of the allowed communication list conversion unit 123 in the present invention with reference to FIG. 12.

First, in Step S201, the allowed communication list conversion unit 123 acquires the detection rule list 125 of FIG. from the detection rule storage unit 124. The allowed communication list conversion unit 123 analyzes the correspondence relationship between a request and a response for each rule based on the detection rule list 125. As a result, the following three analysis results are obtained.

A) One-to-one correspondence between request and response

B) 0-to-m correspondence between request and response (m≥1)

C) 1-to-n correspondence between request and response (n≥2)

The result A) represents a relationship between one request communication and one response communication. Examples of A) are read communication and write communication using the TCP protocol.

The result B) represents a relationship in which there are a plurality of response communications corresponding to a request communication, but there is no dependency relationship among those response communications. An example of B) is keep-alive communication by broadcasting.

The result C) represents a relationship in which there are a plurality of response communication candidates for one request communication, and when any one of those candidates is satisfied, the other candidates are invalid. An example of C) is connection-oriented communication using the UDP protocol.

In the analysis of Step S201, when the analysis result is A), the processing proceeds to Step S202, when the analysis result is B), the processing proceeds to Step S205, or when the analysis result is C), the processing proceeds to Step S208. In the following, a description is given of each case.

When the analysis result is A), first, in Step S202, one flag is defined for each rule number of the request rule in the detection rule list 125 of FIG. 4, and adds an operation of setting the flag to a flag operation for the action in the allowed communication list 119c of FIG. 7 corresponding to the action number of that rule number. Next, in Step S203, a flag condition for determining whether or not the flag assigned in Step S202 is set to the response rule in the allowed communication list 119a of FIG. 5. Next, in Step S204, an operation of resetting the flag assigned in Step S202 is added to a flag operation in the allowed communication list 119c corresponding to the action number of the response rule.

When the analysis result is B), first, in Step S205, m flags are defined for each rule number of the request rule in the detection rule list 125 of FIG. 4, and adds an operation of setting the flags to a flag operation for the action in the allowed communication list 119c of FIG. 7 corresponding to the action number of that rule number. Next, in Step S206, the m flags assigned in Step S205 are assigned one by one in the allowed communication list 119a of FIG. 5, and a flag condition for determining whether or not the flags are set is added. Next, in Step S207, an operation of resetting the flags assigned in Step S206 is added to a flag operation in the allowed communication list 119c corresponding to the action number of the response rule.

When the analysis result is C), first, in Step S208, one flag is defined for each rule number of the request rule in the detection rule list 125 of FIG. 4, and adds an operation of setting the flag to a flag operation for the action in the allowed communication list 119c of FIG. 7 corresponding to the action number of that rule number. Next, in Step S209, a flag condition for determining whether or not the flag assigned in Step S208 is set to all the response rules in the allowed communication list 119a of FIG. 5. Next, in Step S210, an operation of resetting the flag assigned in Step S208 is added to a flag operation in the allowed communication list 119c corresponding to the action number of the response rule.

This concludes the description of the data determination method and the data determination processing step S100 of the data determination device 101 according to the first embodiment.

As described above, the data determination device 101 according to the first embodiment includes the following configuration:

(A) the flag management unit 107 configured to store a current value of a flag set for an own device;

(B) the state management unit 104 configured to store the current operation state 121 of the own device transitioning between a plurality of operation states, and to cause the operation state of the own device to transition in accordance with the state transition model 114 defining transition between the plurality of operation states, depending on any one or more of an input signal from an outside, for example, notification data, and the current value 115 of the flag stored in the flag management unit 107;

(C) the allowed communication list conversion unit 123 configured to convert the detection rule 125, which describes a correspondence relationship between communication data indicating request communication and communication data indicating response communication to the request communication, into the allowed communication lists 119a and 119c registering in advance communication data for which communication is allowed for each of the plurality of operation states; and (D) the determination unit 103 configured to determine whether communication data 113 input to the own device is communication data in the current operation state 121 registered in the allowed communication lists 119a and 119c by using any one or more of the current operation state 121 of the own device stored in the state management unit 104, the allowed communication lists 119a and 119c, and the current value 115 of the flag stored in the flag management unit 107, to thereby determine whether the communication data 113 input to the own device is normal or abnormal.

When converting the detection rule into the allowed communication lists 119a and 119c, the allowed communication list conversion unit 123 assigns one or more flags to the request communication and the response communication, between which the correspondence relationship is described in the detection rule, and describes, in the allowed communication list, details of a flag operation specifying a value to be set to the flag and a flag condition for determining whether the value is set in the flag.

When the determination unit 103 determines that communication data indicating request communication is normal at the time of determination of the communication data, the determination unit 103 updates the current value of the flag of the flag management unit 107 based on details of the flag operation described in the allowed communication list as an action of the request communication. In this case, for example, the flag F1 is set to 1.

When determining communication data indicating response communication corresponding to the request communication, the determination unit 103 determines whether or not the current value of the flag F1 matches "1", which is the value of the flag F1 updated as an action of request communication, based on the flag condition described in the allowed communication list, to thereby determine whether the response communication correctly corresponds to previous request communication to determine whether the response communication is normal.

When the determination unit 103 determines that the response communication is normal, the determination unit 103 resets the current value of the flag of the flag management unit 107 in accordance with details of the flag operation described in the allowed communication list as an action of the response communication. That is, in this case, for example, the flag F1 is set to 0.

In this manner, the determination unit 103 examines the correspondence relationship between a request and a response by ON/OFF of the current value of the flag at the time of determination of data, and determines that communication data is due to an illegal attack when the correspondence relationship between a request and a response is not satisfied, and thus it is possible to detect an attack in a more sophisticated manner.

Further, the determination unit 103 cuts off communication of the communication data when the determination unit 103 determines that the communication data is abnormal.

With the configuration described above, in the data determination device according to the first embodiment, the correspondence relationship between request communication and response communication is described at the time of definition of normal communication in the allowed communication list, and thus it is possible to describe all the types of communication data without causing combinatorial explosion. Further, the correspondence relationship between request communication and response communication can be determined by setting/resetting of the flag, and whether the communication data is normal or abnormal is determined also in consideration of the correspondence relationship between request communication and response communication. Therefore, it is possible to detect that communication data is invalid even when a third person has hacked a server and performed a cyberattack using the server. Further, it is possible to search an increasing number of detection rules at high speed by defining the correspondence relationship between request communication and response communication.

Further, the allowed communication list conversion unit 123 may further generate the allowed communication lists 119b and 119d.

That is, the allowed communication list conversion unit 123 sorts pieces of communication data in the allowed communication list in priority order of operation state, transmission source, and transmission destination, or in priority order of operation state, transmission destination, and transmission source, and then generates the allowed communication list 119b in which the respective pieces of communication data are assigned with the sorted orders for each operation state as indices.

Further, the allowed communication list conversion unit 123 generates the allowed communication list 119d for representing the index head number, which indicates a head pointer for specifying a search range of the sorted allowed communication list 119b to be referred to, and the number of searches, based on the operation state, information on the transmission source, and information on the transmission destination.

At this time, the determination unit 103 acquires the current operation state 121 of the own device from the state management unit 104, and acquires the information on the transmission source and the information on the transmission destination, from the communication data 113 serving as the determination target. The determination unit 103 then extracts the index head number and the number of searches from the allowed communication list 119d based on the current operation state 121, the information on the transmission source, and the information on the transmission destination, identifies the search range to be referred to in the sorted allowed communication list 119b based on the extracted index head number and number of searches, and compares communication data in the allowed communication list 119a satisfying the search range and the communication data 113 serving as the determination target with each other, to thereby determine whether the communication data 113 serving as the determination target is normal or abnormal.

Further, the data determination device 101 according to the first embodiment may include the following configuration as required:

(E) the timer 108 configured to measure a continuation period of the current operation state of the own device transitioning between the plurality of operation states;

(F) the allowed communication list storage unit 109 configured to store the allowed communication lists 119a to 119d;

(G) the warning unit 110 configured to issue a warning when the determination unit 103 determines that the communication data is abnormal; and (H) the detection rule storage unit 124 configured to store the detection rule.

Figure 13A:
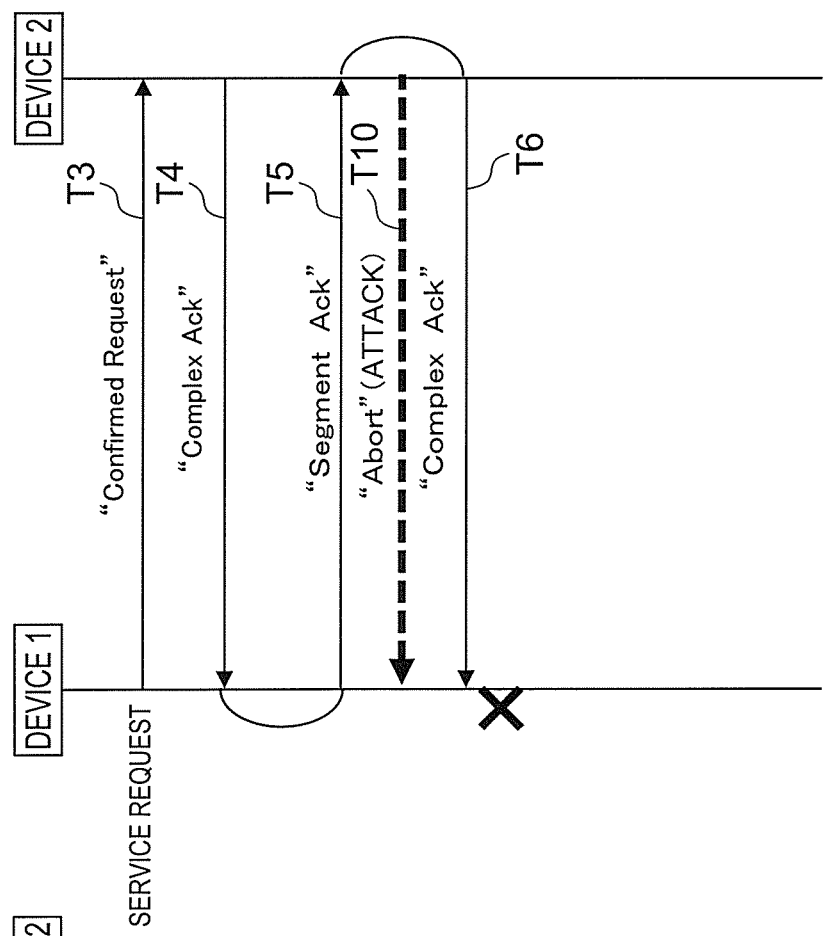
FIGS. 13A and 13B are diagrams for illustrating effects obtained from the data determination device according to the first embodiment of the present invention.
Figure 13B:
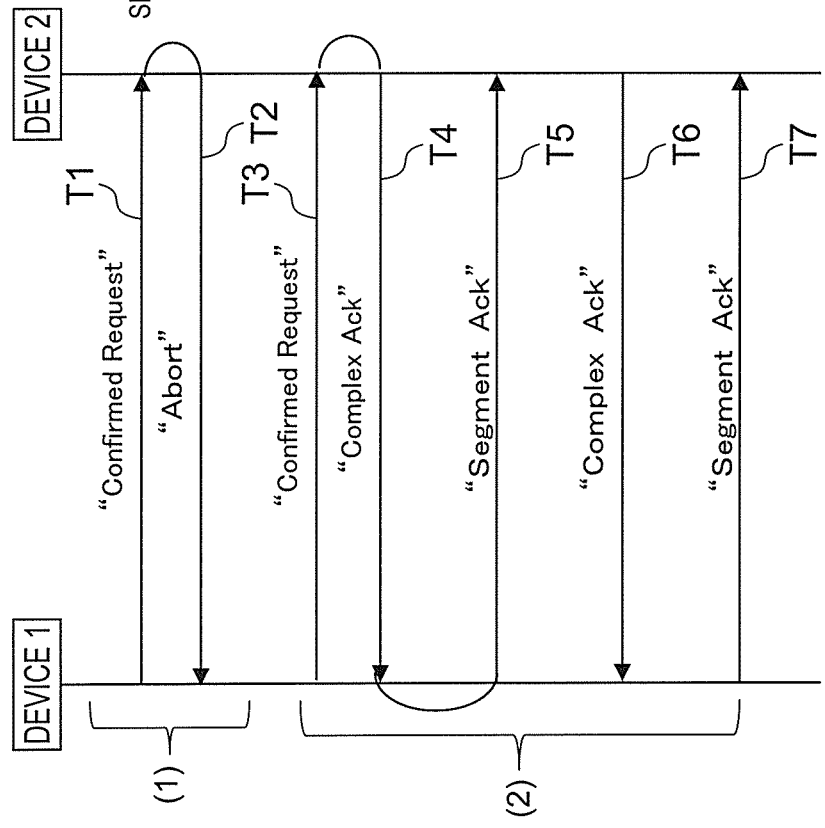

According to the first embodiment, as described above, the determination unit 103 examines the correspondence relationship between a request and a response by ON/OFF of the current value of the flag, to thereby be able to detect that communication data is due to an illegal attack when the correspondence relationship between a request and a response is not satisfied. An example thereof is described with reference to FIGS. 13A and 13B. FIGS. 13A and 13B are exemplary illustrations of BACnet communication. A device 1 and a device 2 in FIGS. 13A and 13B correspond to the controller 300 and the monitoring control device 200, respectively. In FIG. 3, illustration of the data determination device 101 is omitted.

In FIGS. 13A and 13B, it is assumed that FIG. 13A is an illustration of a normal sequence, and FIG. 13B is an illustration of an attack sequence. In FIG. 13A and FIG. 13B, a request being a piece of communication data T1 and a response being a piece of communication data T2 correspond to each other, and requests being pieces of communication data T3, T5, and T7 and responses being pieces of communication data T4 and T6 correspond to each other. A flag is assigned to each correspondence.

In FIG. 13A, it is assumed that the device 2 returns "Complex Ack" or "Abort" to a "Confirmed Request" request from the device 1.

That is, in FIG. 13A, "Abort" being the communication data T2 is returned to a "Confirmed Request" request being the communication data T1, and "Complex Ack" being the communication data T4 is returned to a "Confirmed Request" request being the communication data T3.

Further, as in the communication data T4, when the device 2 has returned "Complex Ack" to the device 1, it is assumed that the device 1 returns "Segment Ack", and this exchange is performed twice to end communication. That is, when the device 2 has returned "Complex Ack" being the communication data T4, the device 1 returns "Segment Ack" being the communication data T5. This is the first exchange. After that, the device 2 returns "Complex Ack" being the communication data T6 again, and the device 1 returns "Segment Ack" being the communication data T7. This is the second exchange. Communication is finished in this manner.

This is the normal sequence of FIG. 13A. At this time, the determination unit 103 of the data determination device 101 determines whether or not the correspondence relationship between a request and a response is satisfied based on the flag value.

Meanwhile, FIG. 13B is an illustration of a case in which an illegal program is installed in the device 2. The reference symbols T3 to T6 in FIG. 13B correspond to the reference symbols T3 to T6 in FIG. 13A, respectively. In FIG. 13B, it is assumed that the device 2 has attacked the device 1 by returning "Abort" before transmission of the second "Complex Ack" from the device 2 to the device 1 due to an illegal program of the device 2. In this case, the determination unit 103 of the data determination device 101 determines that the correspondence relationship between request communication and response communication is not satisfied because the device 2 has not transmitted "Complex Ack" to the device 1 and the values of the flag do not match each other, to thereby determine that communication is abnormal and does not perform further communication. Even when a valid program on the device 2 has returned "Complex Ack" after that, communication cannot be finished.

The "Abort" itself from the device 2 is normal communication, and thus such a case may be missed in the case of a related-art data determination device. However, the data determination device according to the first embodiment uses the correspondence relationship between request communication and response communication for determination of data. Therefore, it is possible to detect an attack from a third person even in a case of the device 2 being hacked by a third person.

Further, with the data determination device according to the first embodiment, indices are created at the transmission source and the transmission destination and the search range is narrowed down even when the number of detection rules has increased, and thus it is possible to perform matching between the allowed communication list and the determination target data at high speed.

Further, with the data determination device according to the first embodiment, processing other than resorting by frequency can all be executed in advance, and thus it is possible to implement the processing without influencing the determination processing.

REFERENCE SIGNS LIST 101 data determination device, 102 communication unit, 103 determination unit, 104 state management unit, 105 state transition model storage unit, 106 operation unit, 107 flag management unit, 108 timer, 109 allowed communication list storage unit, 110 warning unit, 111 transmission data, 112 reception data, 113 communication determination data, 114 state transition model, 115 flag current value, 116 flag set value, 117 timer current value, 118 timer set value, 119a, 119b, 119c, 119d allowed communication list, 200 monitoring control device, 300 controller, 310 application.

The invention claimed is:

1. A data determination device, comprising:
a flag manager to store a current value of a flag set for an own device;
a state manager to store a current operation state of the own device transitioning between a plurality of operation states, and to cause the operation state of the own device to transition in accordance with a state transition model defining transition between the plurality of operation states, according to any one or more of an input signal from an outside and the current value of the flag stored in the flag manager;

an allowed communication list converter to convert a detection rule, which describes a correspondence relationship between communication data indicating request communication and communication data indicating response communication to the request communication, into an allowed communication list registering in advance communication data for which communication is allowed for each of the plurality of operation states; and a determiner to determine whether communication data input to the own device is communication data in the current operation state registered in the allowed communication list by using any one or more of the current operation state of the own device stored in the state manager, the allowed communication list, and the current value of the flag stored in the flag manager, to thereby determine whether the communication data input to the own device is normal or abnormal, wherein the allowed communication list converter is configured to, when converting the detection rule into the allowed communication list:
  assign a flag to each of the request communication and the response communication, between which the correspondence relationship is described in the detection rule; and
  describe, in the allowed communication list, details of a flag operation specifying a set value to be set to the flag and a flag condition for determining whether the set value is set in the flag, in association with each other, and wherein the determiner is configured to:
  set the set value in the flag in accordance with the details of the flag operation after determining that communication data on the request communication is normal;
  determine whether the set value is set in the flag based on the flag condition when determining whether communication data on the response communication to the request communication is normal; and
  determine that the communication data on the response communication is normal when the set value is set, to thereby reset the flag.

2. The data determination device according to claim 1, further comprising a warner to issue a warning when the determiner determines that the communication data on the request communication or the communication data on the response communication is abnormal.

3. The data determination device according to claim 1, further comprising a timer to measure a continuation period in which the current operation state of the own device has continued,
wherein the state manager is configured to cause the operation state of the own device to transition in accordance with the state transition model according to any one or more of an input signal from the outside, a timer current value of the timer, and the current value of the flag stored in the flag manager, and
wherein the determiner is configured to determine whether the communication data input to the own device is communication data in the current operation state registered in the allowed communication list by using any one or more of the current operation state of the own device stored in the state manager, the allowed communication list, and the current timer value from the timer, and the current value of the flag stored in the flag manager.

4. The data determination device according to claim 1, wherein the allowed communication list converter is configured to:
  sort pieces of the communication data in the allowed communication list in priority order of operation state, transmission source, and transmission destination, or in priority order of operation state, transmission destination, and transmission source; and
  assign the sorted orders to the pieces of the communication data as indices, wherein the allowed communication list converter is configured to create a list representing: an index head number indicating a head pointer for specifying a search range of the sorted allowed communication list to be referred to; and a number of searches, based on the operation state, information on the transmission source, and information on the transmission destination, and wherein the determiner is configured to:
  acquire the current operation state of the own device from the state manager, and acquire the information on the transmission source and the information on the transmission destination from the communication data serving as a determination target;
  extract, from the list, the index head number and the number of searches based on the current operation state, the information on the transmission source, and the information on the transmission destination;
  identify the search range to be referred to in the sorted allowed communication list based on the index head number and the number of searches; and
  compare the communication data in the allowed communication list satisfying the search range with the communication data serving as the determination target, to thereby determine whether the communication data serving as the determination target is normal or abnormal.

5. The data determination device according to claim 1, wherein the state transition model further defines transition of the operation state according to a result of determination output by the determiner.

6. The data determination device according to claim 1, wherein the determiner is configured to cut off communication of the communication data when the determiner determines that the communication data is abnormal.

7. A data determination method, comprising:
storing a current value of a flag set for an own device;
causing an operation state of the own device to transition and storing a current operation state of the own device in accordance with a state transition model defining transition between a plurality of operation states of the own device according to any one or more of an input signal from an outside and the current value of the flag;
converting a detection rule, which describes a correspondence relationship between communication data indicating request communication and communication data indicating response communication to the request communication, into an allowed communication list registering in advance communication data for which communication is allowed for each of the plurality of operation states; and
determining whether communication data input to the own device is communication data in the current operation state registered in the allowed communication list by using any one or more of the current operation state of the own device, the allowed communication list, and the current value of the flag, to thereby determine whether the communication data input to the own device is normal or abnormal, wherein the method includes, when converting the detection rule into the allowed communication list:

assigning a flag to each of the request communication and the response communication, between which the correspondence relationship is described in the detection rule; and describing, in the allowed communication list, details of a flag operation specifying a set value to be set to the flag and a flag condition for determining whether the set value is set in the flag, in association with each other, and wherein the method includes:

setting the set value in the flag in accordance with the details of the flag operation after determining that communication data on the request communication is normal;

determining whether the set value is set in the flag based on the flag condition when determining whether communication data on the response communication to the request communication is normal; and determining that the communication data on the response communication is normal when the set value is set, to thereby reset the flag.

8. A non-transitory computer readable storage medium embodied thereon a program executable by a computer, the program for causing, in order to determine data, the computer to function as:

a flag manager to store a current value of a flag set for an own device;

a state manager to store a current operation state of the own device transitioning between a plurality of operation states, and to cause the operation state of the own device to transition in accordance with a state transition model defining transition between the plurality of operation states according to any one or more of an input signal from an outside and the current value of the flag stored in the flag manager;

an allowed communication list converter to convert a detection rule, which describes a correspondence relationship between communication data indicating request communication and communication data indicating response communication to the request communication, into an allowed communication list registering in advance communication data for which communication is allowed for each of the plurality of operation states; and a determiner to determine whether communication data input to the own device is communication data in the current operation state registered in the allowed communication list by using any one or more of the current operation state of the own device stored in the state manager, the allowed communication list, and the current value of the flag stored in the flag manager, to thereby determine whether the communication data input to the own device is normal or abnormal, wherein the allowed communication list converter is configured to, when converting the detection rule into the allowed communication list:

assign a flag to each of the request communication and the response communication, between which the correspondence relationship is described in the detection rule; and describe, in the allowed communication list, details of a flag operation specifying a set value to be set to the flag and a flag condition for determining whether the set value is set in the flag, in association with each other, and wherein the determiner is configured to:

set the set value in the flag in accordance with the details of the flag operation after determining that communication data on the request communication is normal;

determine whether the set value is set in the flag based on the flag condition when determining whether communication data on the response communication to the request communication is normal; and determine that the communication data on the response communication is normal when the set value is set, to thereby reset the flag.

\* \* \* \* \*